United States Patent
Sones et al.

(10) Patent No.: US 7,308,142 B2
(45) Date of Patent: Dec. 11, 2007

(54) SYSTEM AND METHODS FOR ROGUE CAN DETECTION

(75) Inventors: Richard A. Sones, Cleveland, OH (US); Brain M. Baird, Mantua, OH (US)

(73) Assignee: Applied Vision Company, LLC, Cuyahoga Falls, OH (US)

( * ) Notice: Subject to any disclaimer, the term of this patent is extended or adjusted under 35 U.S.C. 154(b) by 526 days.

(21) Appl. No.: 11/077,288

(22) Filed: Mar. 10, 2005

(65) Prior Publication Data
US 2006/0204080 A1 Sep. 14, 2006

(51) Int. Cl.
*G06K 9/68* (2006.01)
(52) U.S. Cl. .................. 382/218; 382/141; 382/159
(58) Field of Classification Search ........ 382/141–149, 382/159, 197, 209, 218, 288; 348/92, 125
See application file for complete search history.

(56) References Cited

U.S. PATENT DOCUMENTS 5,245,399 A * 9/1993 Wertz et al. .............. 356/71
5,911,003 A * 6/1999 Sones ...................... 382/162
2005/0286753 A1* 12/2005 Ho ........................... 382/141

* cited by examiner

*Primary Examiner*—Daniel Mariam
(74) *Attorney, Agent, or Firm*—Hahn Loeser & Parks, LLP; David J. Muzilla

(57) ABSTRACT

A vision system and methods to detect rogue objects on a product processing line are disclosed. The vision system includes a camera, a source of illumination, a user interface, and a computer-based platform including a memory. The vision system captures images from objects on the product processing line as the objects pass by the camera which is mounted on the product processing line. Image pixel data is converted to vectors of mean pixel values for each captured image from each object, using the vision system. The vectors are compared to a vector training set stored within the memory of the vision system to determine if the objects correspond to "rogue" objects or not, using the vision system. The vector training set is representative of the current product (i.e., objects) being processed on the product processing line.

32 Claims, 10 Drawing Sheets

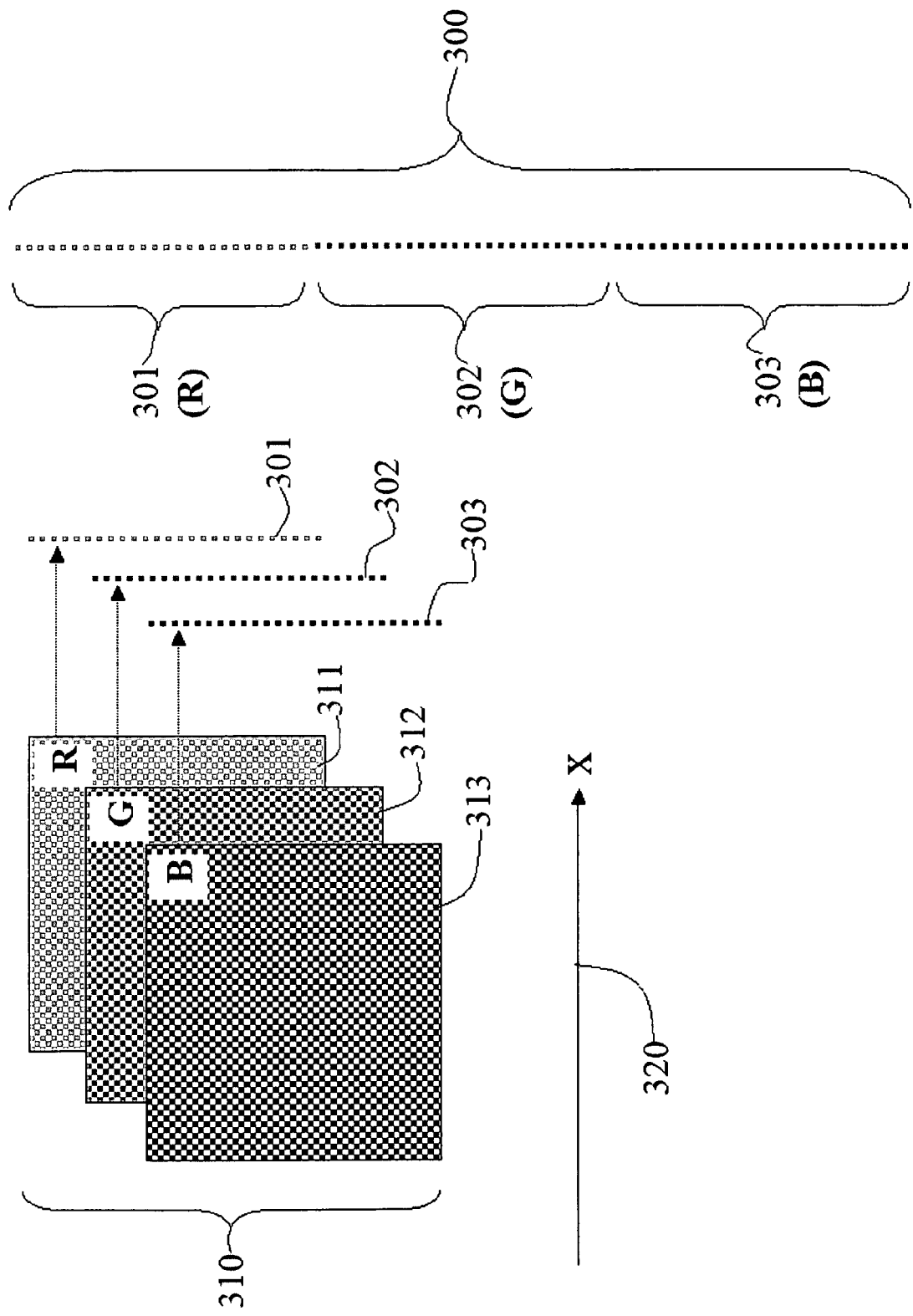

SYSTEM AND METHODS FOR ROGUE CAN DETECTION

CROSS-REFERENCE TO RELATED APPLICATIONS/INCORPORATION BY REFERENCE

U.S. patent application Ser. No. 10/849,955, filed on May 19, 2004, is incorporated herein by reference in its entirety. Also, U.S. patent application Ser. No. 11/054,815, filed on Feb. 10, 2005, which is a CIP of pending U.S. patent application Ser. No. 10/849,955, is incorporated herein by reference in its entirety.

TECHNICAL FIELD

Certain embodiments of the present invention relate to training, process monitoring, and detection. More particularly, certain embodiments of the present invention relate to a vision system and methods for continuously training and monitoring a production line process in order to detect and eliminate any rogue objects on the production line.

BACKGROUND OF THE INVENTION

Manufacturers of products that are produced in high volume as part of a process using, for example, a process line, employ quality assurance methods to ensure that certain features of the product (e.g., color, pattern, alignment, texture) are consistent and match a production reference standard. The product moving down a process line is often spatially oriented in a random manner along the process line. For example, soda cans having a specific pattern printed on the cylindrical outer surface are typically oriented randomly about the vertical axis of rotation of the predominantly cylindrical can. Examples of such processes include package printing processes, soda can printing processes, soda can filling processes, and other processes which may employ more complex color schemes that are repeated or are placed next to each other in use.

A challenging task is to detect and eliminate so called "rogue" cans from the processing line. A rogue can is a soda can that gets onto the processing line accidentally. For example, soda cans from a previous run (e.g., a sugar-free soda product run) get squirreled away in some corner of the conveyor of the processing line and then pop out on the line during a current run (e.g., a sugar-based product run). If such a rogue can is not detected, a sugar-free labeled soda can will be filled with a sugar-based soda product. This could be devastating to, for example, a diabetic person who drinks the sugar-based product from the sugar-free labeled soda can. In general, a "rogue" can or object is an object whose exterior printing or labeling is significantly different from that of the current product running on the processing line. "Significantly different" usually means that the rogue object is for another product altogether (e.g., for a sugar-free soda product instead of a sugar-based soda product).

Rogue cans tend to occur infrequently (e.g., one out of every million cans) and, in general, they do not tend to occur in groups. Therefore, to detect rogue cans, every soda can on the processing line must be observed. It is not sufficient to periodically sample the soda cans as they come down the processing line. Another type of rogue can is called a "silver bullet". A silver bullet is a soda can that has not been printed (i.e., the outside of the can remains its original silver color). Soda cans may occasionally somehow sneak through the printing process without being printed. Silver bullets do tend to come down the processing line several at a time, however. This can occur, for example, when a printing process is running low on printing ink and switches in a new container of ink. Several soda cans may get past the printing step as silver bullets while the new container of ink is being switched in to be used.

Therefore there remains a need in the art for a fast and convenient way to efficiently monitor a production process with respect to detect so called "rogue objects" (e.g., "rogue soda cans"), where the production objects being monitored may have a random spatial orientation, at least around one axis.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention comprises a method of training a vision system on a process monitoring line. The method comprises acquiring one image from each object of a predetermined number of objects passing by the vision system on the process monitoring line. Each image corresponds to a random spatial orientation of each corresponding object with respect to the vision system. Also, each image comprises at least one array of pixel values stored within the vision system. The method further comprises generating a plurality of mean pixel values, along one dimension of the at least one array of pixel values, for each acquired image to form a vector of mean pixel values for each acquired image. The method also includes storing each vector of mean pixel values for each acquired image within a memory of the vision system to form a vector training set of the vision system.

Another embodiment of the present invention comprises a method of monitoring objects on a process monitoring line. The method comprises acquiring an image from a next object passing by a vision system on the process monitoring line. The image corresponds to a random spatial orientation of the next object with respect to the vision system. Also, the image comprises at least one array of pixel values stored within the vision system. The method further comprises generating a plurality of mean pixel values, along one dimension of the at least one array of pixel values for the acquired image, to form a next vector of mean pixel values for the acquired image. The method also includes comparing the next vector of mean pixel values to each training vector of mean pixel values in a stored vector training set in the vision system to generate one discrepancy value for each training vector in the vector training set, forming a set of discrepancy values. The method further includes selecting one discrepancy value from the set of discrepancy values and comparing the selected discrepancy value to a predetermined threshold value to determine if the next object is a rogue object.

A further embodiment of the present invention comprises a vision system for training and monitoring a process. The vision system comprises a source of illumination positioned to illuminate objects as the objects move along a process monitoring line in spatially random orientations. The vision system further includes a camera positioned on the process monitoring line to capture at least one image from each of the illuminated objects, forming a plurality of images, as each object passes through a field-of-view of the camera.

The vision system also comprises a computer-based platform being connected to the camera to generate a vector of mean pixel values from each of the plurality of images, forming a plurality of vectors of mean pixel values, and to store at least some of the vectors of mean pixel values as a vector training set.

Another embodiment of the present invention comprises a method for training and monitoring a process. The method includes generating a vector training set, comprising training vectors of mean pixel values, from images acquired from a predetermined number of objects passing by a vision system on a process monitoring line. The method further includes generating a first next vector of mean pixel values from a first next image acquired from a first next object passing by the vision system on the process monitoring line immediately after the predetermined number of objects. The method also comprises comparing the first next vector to each training vector of the vector training set to generate one discrepancy value for each training vector, forming a set of discrepancy values. The method further comprises selecting one discrepancy value from the set of discrepancy values and comparing the selected discrepancy value to a predetermined threshold value to determine if the first next object is a rogue object.

These and other advantages and novel features of the present invention, as well as details of illustrated embodiments thereof, will be more fully understood from the following description and drawings.

BRIEF DESCRIPTION OF SEVERAL VIEWS OF THE DRAWINGS

FIG. 3A shows a graphical illustration of forming a training vector from arrays of RGB pixel values using the method of FIGS. 2A-2B, in accordance with an embodiment of the present invention.

DETAILED DESCRIPTION OF THE INVENTION

Figure 1:
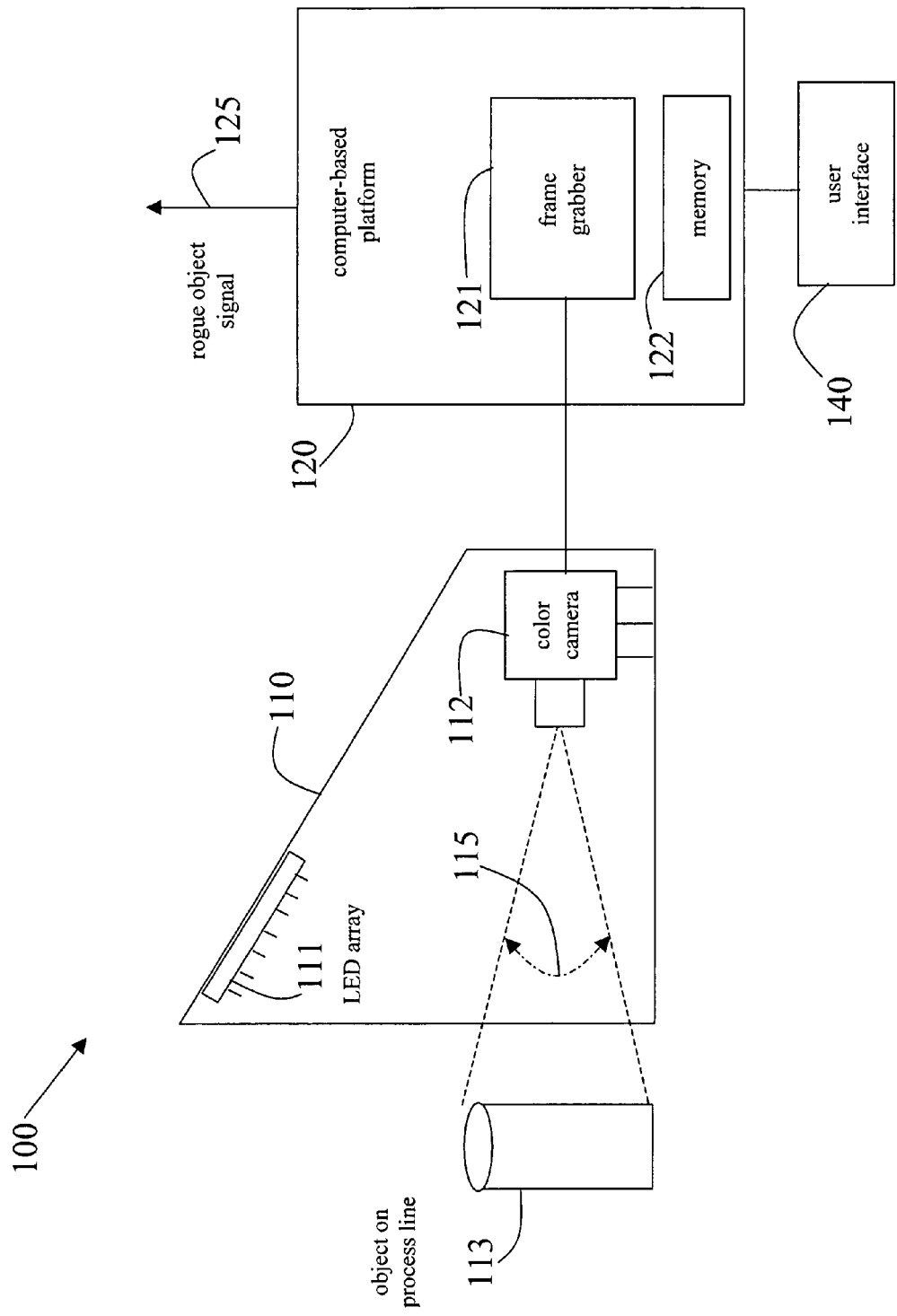
FIG. 1 illustrates an embodiment of a vision system for training and monitoring a process for rogue object detection, in accordance with various aspects of the present invention.

FIG. 1 illustrates an embodiment of a vision system 100 for training and monitoring a process for rogue object detection, in accordance with various aspects of the present invention. The vision system 100 includes an imaging assembly 110 which includes a source of illumination 111 and a color camera 112 to collect images of objects 113 on a process line. The vision system 100 also includes a computer-based platform 120 connected to the color camera 112 in order to store and process image data or signals (e.g., RGB pixel values) collected by the color camera 112 from the objects 113 on the process line. The captured image data corresponds to a predefined region-of-interest (ROI) or "capture area" of the object being imaged. For example, if the objects being imaged are soda cans, the predefined ROI may correspond to a rectangular area covering most of one viewed side of a soda can.

In accordance with an embodiment of the present invention, the computer-based platform 120 comprises a standard, commercial, off-the-shelf personal computer (PC) running a general purpose operating system. However, the computer-based platform 120 also includes image processing software tools which may be commercially available and/or customized software. In accordance with an embodiment of the present invention, the computer-based platform 120 also provides control signals to the color camera 112 in order to control certain functionality of the color camera 112 (e.g., focusing and image capture rate). In accordance with various alternative embodiments of the present invention, the computer-based platform may comprise a single processor, a plurality of processors, or any other device capable of performing the calculations, comparisons, and other processing steps described herein.

In accordance with an embodiment of the present invention, the color camera 112 outputs analog imaging signals and the computer-based platform 120 includes a frame grabber 121 to convert the analog imaging signals to frames of digital imaging data. In accordance with another embodiment of the present invention, the color camera 112 outputs digital imaging signals directly and the frame grabber 121 is not used. The color camera 112 comprises a three-color camera providing RGB (red, green, blue) color imaging signals. In accordance with an alternative embodiment of the present invention, the camera 112 comprises a gray scale or monochrome camera. The computer-based platform 120 includes a memory 122 for storing at least digital imaging data and vector training set data.

The imaging assembly 110 is positioned (i.e., mounted) on a product processing line such that a portion of the objects 113 (e.g., printed soda cans) moving past (e.g., on a conveyor system) the imaging assembly 110 on the processing line and facing the color camera 112 may be imaged by the color camera 112 while being illuminated by the source of illumination 111. In accordance with an embodiment of the present invention, the source of illumination 111 comprises an array of light emitting diodes (LEDs) having a white light spectrum. Such a white light spectrum is useful for determining the true colors of the monitored object. The objects on a typical product processing line pass by the imaging assembly 110 at a rate of about 1800 objects per minute. Other rates are possible as well.

The vision system 100 may also include a user interface 140 including a display which may be used by an operator to view images and to control the vision system 100 via, for example, a menu-driven touch-screen display. The user interface connects to the computer-based platform 120.

In use, the vision system 100 captures color images of objects 113 (e.g., a substantially cylindrical can with printed graphics and text on its outer surface) as the objects 113 pass by the vision system 100 on the production process line. The production process line may be, for example, a soda can filling line for filling soda cans with soda at a rapid pace. Cans used for training the vision system are simply the cans coming down the product process line that pass by the vision system 100, as long as any given can has not been determined to be a rogue can by the vision system 100. As a result, training of the vision system 100 is continuous. That is, the vision system 100 is continuously trained as it looks for rogue objects (e.g., rogue soda cans) on the product processing line.

In accordance with one embodiment of the present invention, a set of two-hundred training images are collected from the first two-hundred objects coming down the processing line using the color camera 112 such that each of the two-hundred training images correspond to a random rotational orientation of the outer surface of an object. That is, each of the two-hundred training images correspond to a random rotational position of an object with respect to the field-of-view 115 of the color camera 112 as the object moves through the field-of-view of the color camera on the process line. The training images are transferred to and digitally stored in the memory 122 of the computer-based platform 120 as arrays of pixel data (e.g., RGB color values or grayscale values).

In accordance with various embodiments of the present invention, pre-processing of the images may be performed such as, for example, scaling of the pixel data values, offsetting the pixel data values, or nearest-neighbor averaging of the pixel data values.

The training images are used in the vision system 100 to form a vector training set which are used to determine whether each subsequent object coming down the processing line is a rogue object or not. Acquiring and processing the images used for training is referred to herein as "continuous on-line training" since the training images are captured from the same process line that are monitored for rogue objects, and since the vector training set is continuously updated. An advantage of "continuous on-line" training is that the exact same vision system and set-up (i.e., geometry, lighting, etc.) is being used to both train and monitor for rogue objects on the same process line.

Figure 2A:
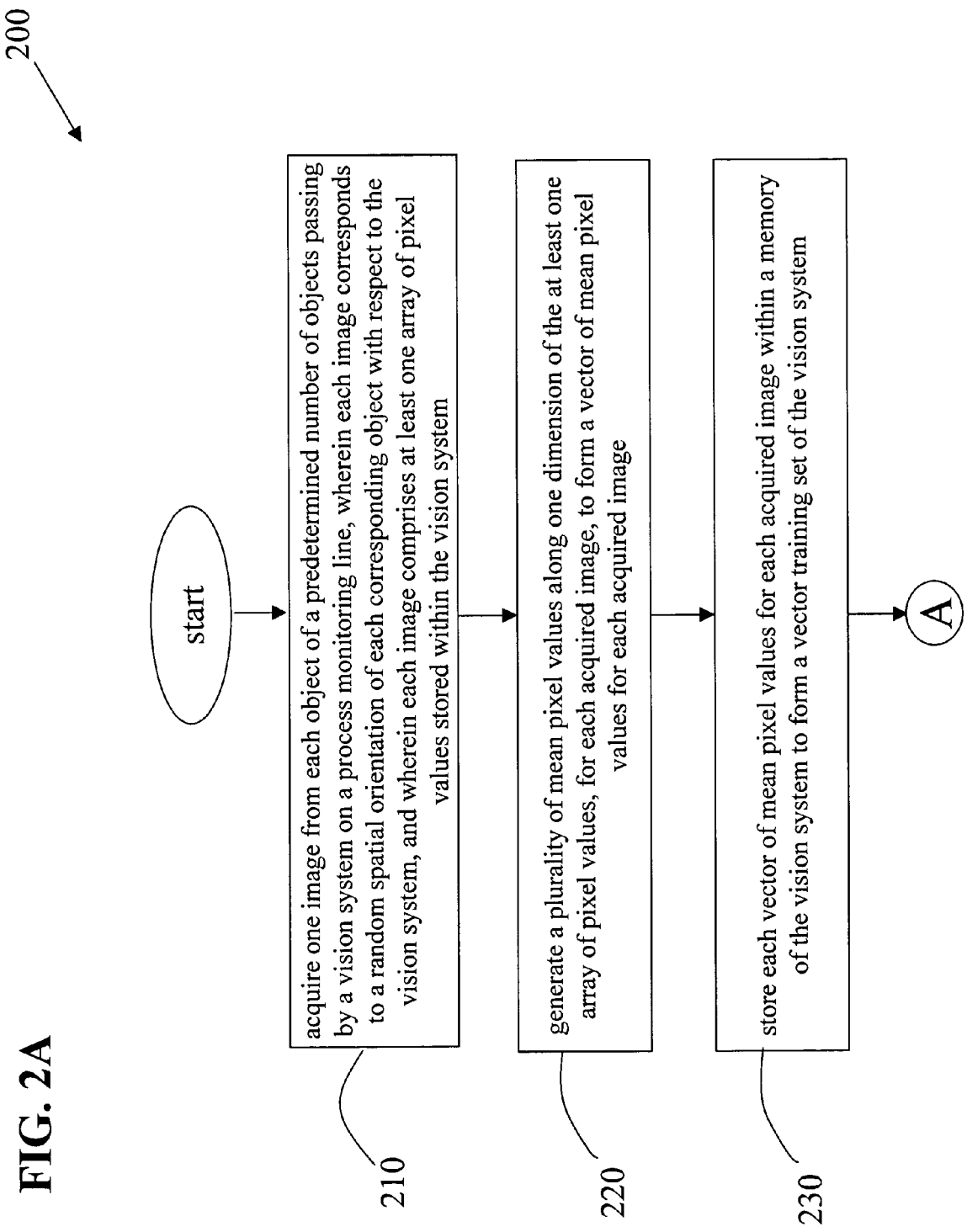
FIGS. 2A-2B illustrates a flowchart of an embodiment of a method of training the vision system of FIG. 1, in accordance with various aspects of the present invention.
Figure 2B:
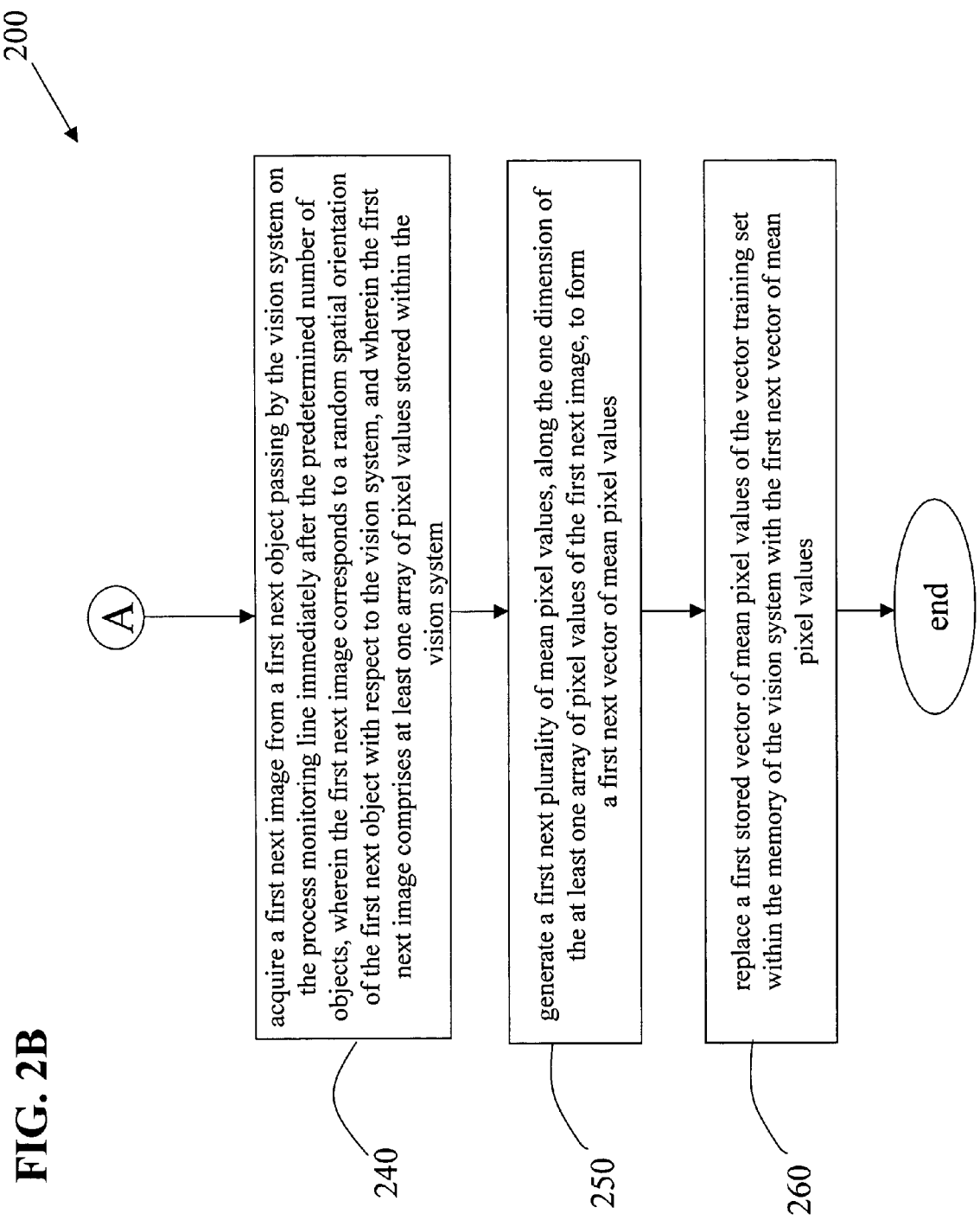

FIGS. 2A-2B illustrate a flowchart of an embodiment of a method 200 of training the vision system 100 of FIG. 1, in accordance with various aspects of the present invention. In step 210, one image is acquired from each object of a predetermined number of objects passing by a vision system on a process monitoring line. Each image corresponds to a random spatial orientation of each corresponding object with respect to the vision system. Also, each image comprises at least one array of pixel values which is stored within the vision system. In step 220, a plurality of mean pixel values is generated along one dimension of the at least one array of pixel values, for each acquired image, to form a vector of mean pixel values for each acquired image. In step 230, each vector of mean pixel values for each acquired image is stored within a memory of the vision system to form a vector training set of the vision system.

In step 240, a first next image is acquired from a first next object passing by the vision system on the process monitoring line immediately after the predetermined number of objects. The first next image corresponds to a random spatial orientation of the first next object with respect to the vision system. Also, the first next image comprises at least one array of pixel values stored within the vision system. In step 250, a first next plurality of mean pixel values is generated along the one dimension of the at least one array of pixel values of the first next image to form a first next vector of mean pixel values. In step 260, a first stored vector of mean pixel values of the vector training set within the memory of the vision system is replaced with the first next vector of mean pixel values.

FIG. 3A shows a graphical illustration of forming a training vector 300 from arrays of RGB pixel values using the method 200 of FIGS. 2A-2B, in accordance with an embodiment of the present invention. When an image 310 is acquired from an object 113 using the color camera 112 of the vision system 100, the image 310 may be stored as three arrays 311, 312, and 313 of color pixel data values. The array 311 corresponds to the red (R) pixel data values, the array 312 corresponds to the green (G) pixel data values, and the array 313 corresponds to the blue (B) pixel data values where the image data is represented in RGB format. Alternatively, if the camera 112 is a monochrome camera, the image data may comprise a single array of gray-scale pixel data.

According to the method 200 of FIGS. 2A-2B, rows of the arrays of pixel data values (311, 312, 313) are averaged along the x-direction 320 to form a red sub-vector of mean pixel values 301, a green sub-vector of mean pixel values 302, and a blue sub-vector of mean pixel values 303. In accordance with an embodiment of the present invention, the x-direction 320 is along the direction of travel of the objects being imaged on the process monitoring line. As a result, any errors caused by a small horizontal shift in the object with respect to the predefined ROI within the field-of-view 115 of the color camera 112, tend to be averaged out.

Horizontal lines that are printed on the surface of a soda can (e.g., as part of the ingredients label) may cause increases in false rejects (i.e., false detections of rogue cans) if there is a slight vertical shift in the soda can position when monitoring the soda cans. In accordance with an embodiment of the present invention, the horizontal line problem can be minimized by blurring the resultant vector along the vertical dimension. For example, a moving box-car average of 3-pixels can be applied to each of the sub-vectors 301-303. As a result, the negative effects of printed horizontal lines is greatly minimized.

The three sub-vectors 301-303 can be represented as being concatenated together to form a single training vector of mean pixel values 300. When a single training vector of mean pixel values is generated for each image acquired from a plurality of objects passing by the vision system 100, a vector training set is accumulated and stored in the memory 122 of the vision system 100. However, in accordance with an alternative embodiment of the present invention, the pixel values could be averaged along columns of the arrays of pixel data values, for example, to form the vectors. In such a case, the resultant vectors may be further blurred in the horizontal (i.e., row) direction to minimize negative effects due to printed vertical lines.

Figure 3B:
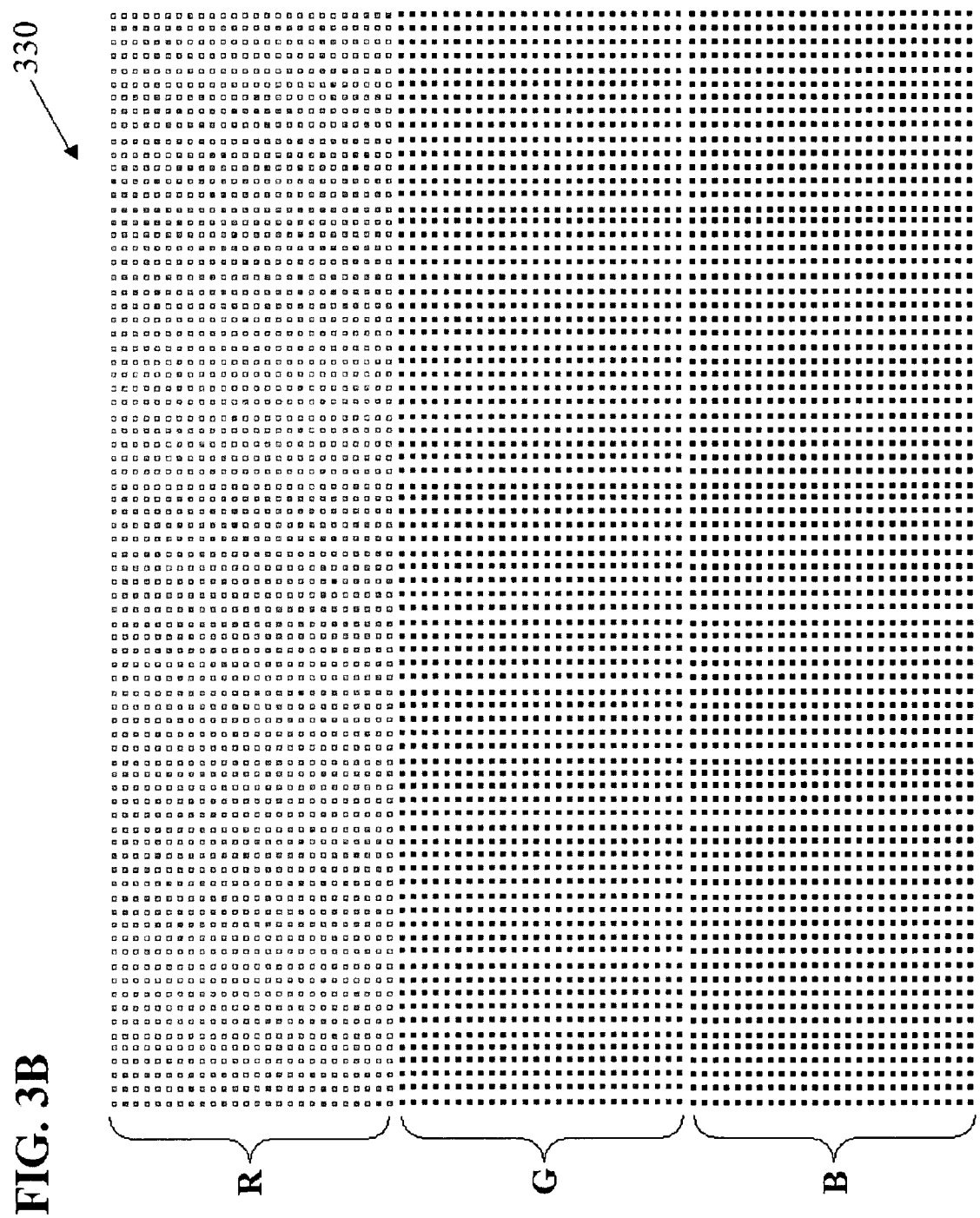
FIG. 3B shows a graphical illustration of a vector training set formed using the method of FIGS. 2A-2B, in accordance with an embodiment of the present invention.

FIG. 3B shows a graphical illustration of a vector training set 330 formed using the method 200 of FIGS. 2A-2B, in accordance with an embodiment of the present invention. Each vector in the vector training set 330 has a red (R) sub-vector, a blue (B) sub-vector, and a green (G) sub-vector. Each vector in the vector training set 330 corresponds to a different object (e.g., a soda can of a particular printed type) that has passed by the vision system 100 on the process monitoring line. Since the objects on the process monitoring line are spatially oriented randomly with respect to the vision system 100, by accumulating enough vectors (e.g., 200 vectors) in the vector training set 330, the vector training set 330 should be a good representation of the different possible spatial views of the objects as they pass by the vision system 100 on the process monitoring line. Therefore, when a next object to be monitored (i.e., next object to be checked to see if the next object is a rogue object) passes by the vision system 100 and is imaged, the resulting vector of mean pixel values for that next object should be very similar to at least one of the vectors in the vector training set 330 if the next object is not a rogue object.

Figure 4:
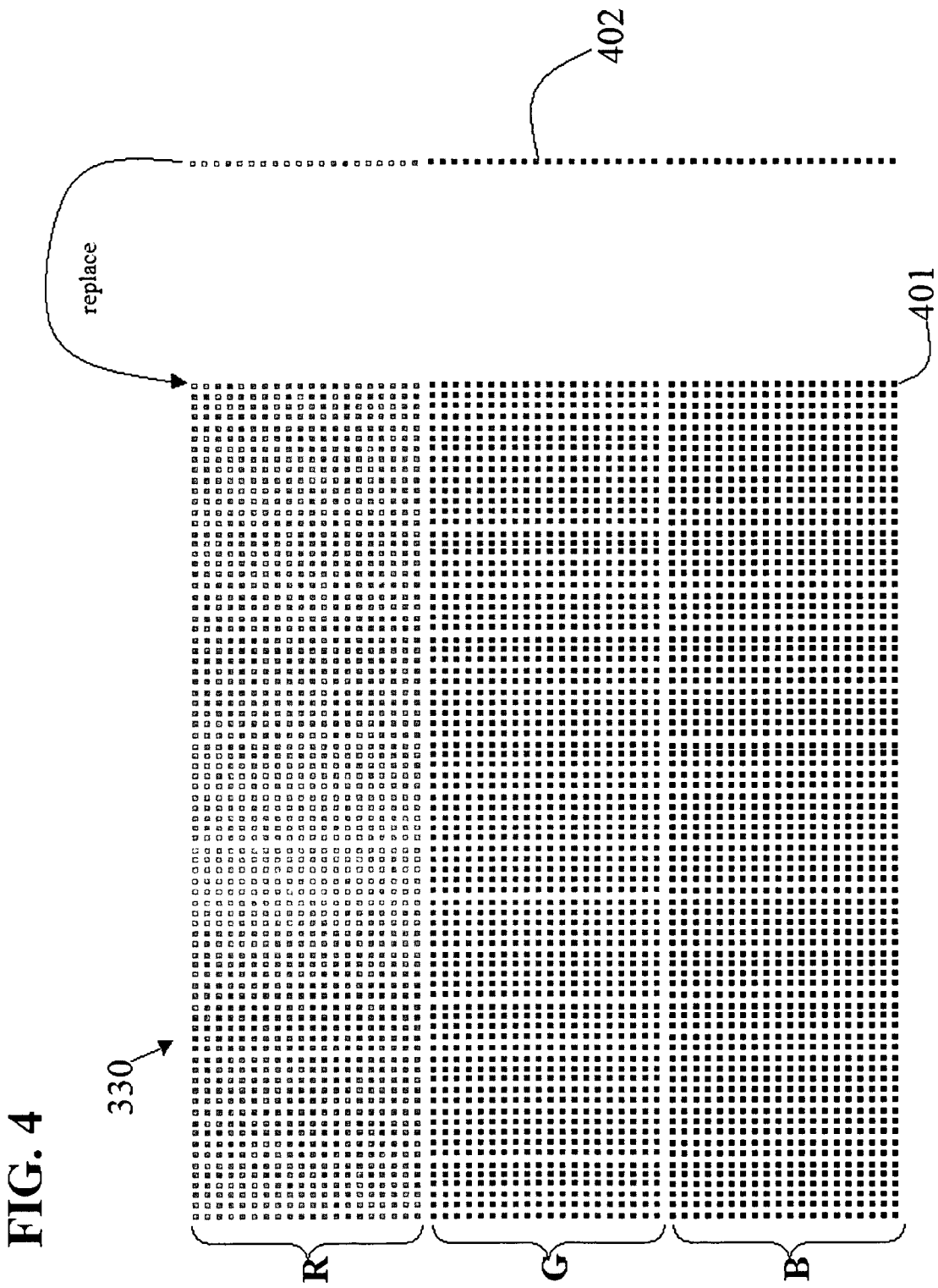
FIG. 4 shows a graphical illustration of replacing a training vector in a vector training set using the method of FIGS. 2A-2B, in accordance with an embodiment of the present invention.

FIG. 4 shows a graphical illustration of replacing a training vector 401 in a vector training set 330 using the method 200 of FIGS. 2A-2B, in accordance with an embodiment of the present invention. Once an initial vector training set 330 has been formed by imaging a predetermined number of objects, the very next object to come down the process monitoring line and enter the field-of-view of the color camera is imaged and a corresponding vector of mean pixel values 402 is formed. If it is determined by the vision system that this next object corresponding to the vector 402 is not a rogue object (as will be explained later herein), then the first training vector 401 in the vector training set 330 is replaced with the vector 402. As a result, the vector training set 330 has been updated based on the next object that was imaged on the process monitoring line. This process continues, replacing the vectors one at a time in a round robin manner, as each subsequent object is imaged on the process monitoring line such that, eventually, all of the vectors in the vector training set will have been replaced. The process repeats, again replacing the training vectors in the vector training set one at a time, as long as objects are being monitored (i.e., imaged and checked for being rogue objects) on the process monitoring line. By continuously updating the vector training set 330 with new vectors, the vector training set will reflect any subtle changes (e.g., subtle color changes) that may be occurring in the printing of the objects (e.g., soda cans) or in the vision system (e.g., drift in the brightness of the illuminating source). Therefore, the process of rogue object detection will not be affected adversely by such subtle changes as will be explained later herein.

Figure 5:
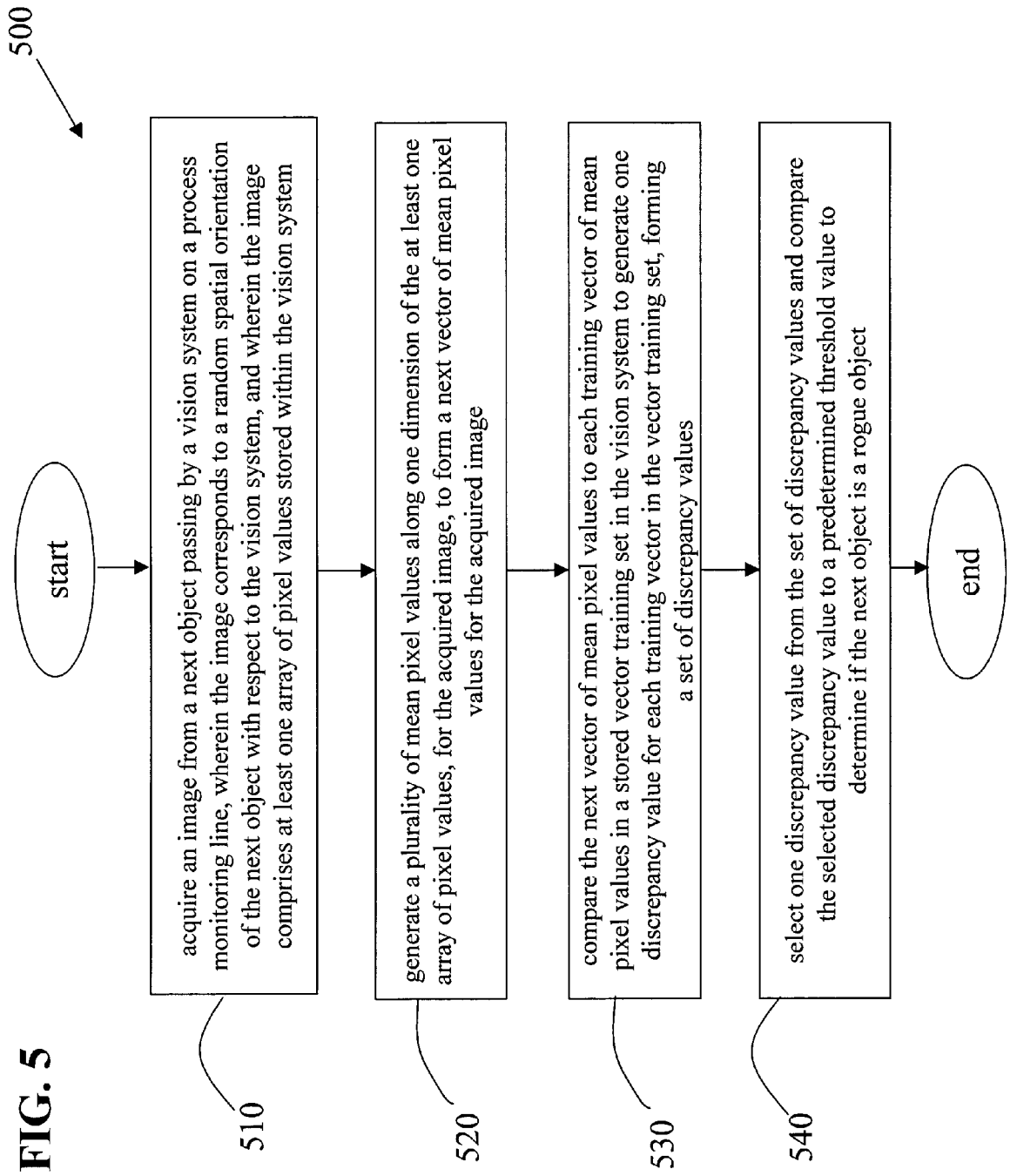
FIG. 5 illustrates a flowchart of an embodiment of a method of monitoring objects on a process line using the trained vision system of FIG. 1, in accordance with various aspects of the present invention.

FIG. 5 illustrates a flowchart of an embodiment of a method 500 of monitoring objects on a process line using the trained vision system 100 of FIG. 1, in accordance with various aspects of the present invention. To say that the vision system 100 is trained is to mean that the vision system 100 has a complete vector training set stored in its memory which corresponds to the current product (i.e. objects) being run or to be run on the process monitoring line. In step 510, an image is acquired from a next object passing by the trained vision system on a process monitoring line. The image corresponds to a random spatial orientation of the next object with respect to the vision system. Also, the image comprises at least one array of pixel values stored within the vision system. In step 520, a plurality of mean pixel values is generated along one dimension of the at least one array of pixel values, for the acquired image, to form a next vector of mean pixel values for the acquired image. In step 530, the next vector of mean pixel values is compared to each training vector of mean pixel values in a stored vector training set in the vision system to generate one discrepancy value for each training vector in the vector training set, forming a set of discrepancy values. In step 540, one discrepancy value is selected from the set of discrepancy values and the selected discrepancy value is compared to a predetermined threshold value to determine if the next object is a rogue object.

For example, in accordance with an embodiment of the present invention, the discrepancy values are generated by taking the difference (on a mean pixel by mean pixel basis) between the current next vector and each of the vectors in the vector training set. This results in a plurality of difference vectors of difference values. Each difference vector of difference values is then turned into a single discrepancy value by taking, for example, the square root of the sum of the squares of the difference values in the difference vector. Discrepancy values may be formed in other ways as well, according to other embodiments of the present invention. For example, the absolute value of the difference values in each difference vector may be summed to form a discrepancy value for each difference vector. As a result, a set of discrepancy values is formed. The smallest discrepancy value is selected from the set of discrepancy values. This smallest discrepancy value corresponds to the vector in the vector training set that is most similar to the current next vector.

The selected discrepancy value is then compared to a predetermined threshold value. The predetermined threshold value is typically set by the user (i.e. operator) of the vision system. If the selected discrepancy value is greater than the predetermined threshold value, then the next object is declared to be a rogue object. That is, the vector corresponding to the next object was too different from any of the vectors in the vector training set. Therefore, the next object is very likely an object having an entirely different printing scheme from that of the expected printing scheme of the objects being currently processed on the process monitoring line (e.g., a soda can filling line). The vision system 100 outputs a rogue object signal 125 (see FIG. 1), indicating that a rogue object has been detected and declared by the vision system. The rogue object signal 125 may be communicated to another part of the processing line to cause the rogue object to be ejected from the processing line.

If the selected discrepancy value is less than the predetermined threshold value, then the next object is not a rogue object and passes the test. That is, the vector corresponding to the next object was close enough to one of the vectors in the vector training set. Therefore, the next object very likely includes the expected printing scheme on its outer surface. The object is left on the processing line to be further processed (e.g., filled). In such a case, the vector corresponding to the next object replaces a next vector in the vector training set, thus providing continuous training of the vision system. Again, this process is continued for every subsequent object coming down the processing line as it passes by the vision system.

Figure 6:
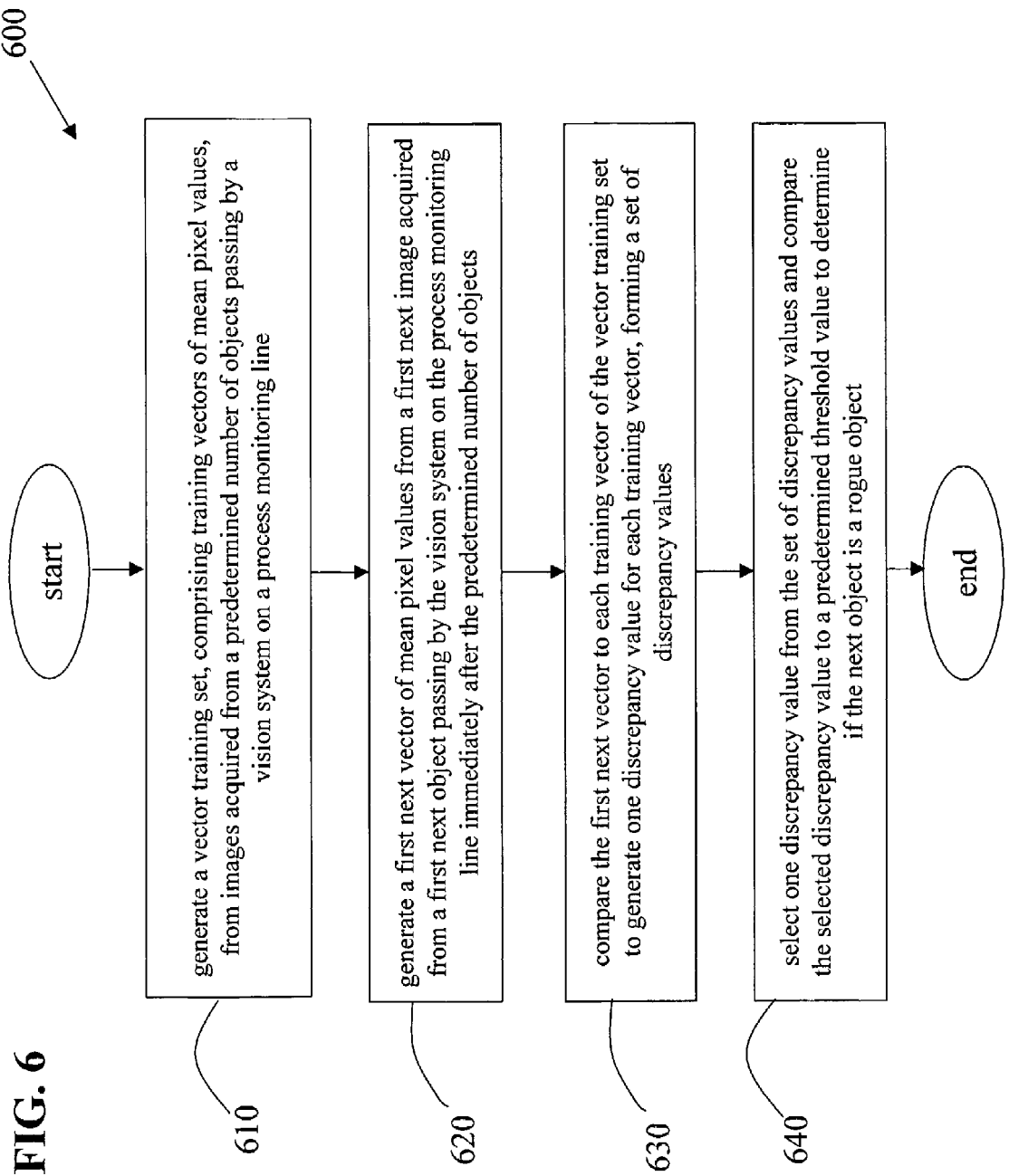
FIG. 6 illustrates a flowchart of an embodiment of a method for training and monitoring a process using the vision system of FIG. 1, in accordance with various aspects of the present invention.

FIG. 6 illustrates a flowchart of an embodiment of a method 600 for training and monitoring a process using the vision system 100 of FIG. 1, in accordance with various aspects of the present invention. In step 610, a vector training set is generated, comprising training vectors of mean pixel values, from images acquired from a predetermined number of objects passing by a vision system on a process monitoring line. In step 620, a first next vector of mean pixel values is generated from a first next image acquired from a first next object passing by the vision system on the process monitoring line immediately after the predetermined number of objects. In step 630, the first next vector is compared to each training vector of the vector training set to generate one discrepancy value for each training vector, forming a set of discrepancy values. In step 640, one discrepancy value is selected from the set of discrepancy values and the selected discrepancy value is compared to a predetermined threshold value to determine if the next object is a rogue object. The vector training set generated in step 610 may be generated according to steps 210-230 of the method 200, in accordance with an embodiment of the present invention.

If a rogue object is suddenly detected, we would not expect to detect another rogue object for maybe another several million objects that pass by the vision system, since rogue objects are relatively rare and generally don't occur in groups. Therefore, in accordance with an embodiment of the present invention, when a rogue object is detected, the vision system deliberately won't declare any more rogue objects for the next predetermined number of objects (e.g., next 200 objects). As a result, the vision system will train on the next predetermined number of objects. That is, the vision system will adapt to what is coming down the processing line. Such a method protects against the case where an object is incorrectly identified as a rogue object because of, for example, a pallet change of product or something similar. Therefore, the vision system not only continuously trains, but the vision system also ensures that no objects are rejected immediately after the declared detection of a rogue object until the vector training set has been completely updated.

An operator of the vision system may select the maximum number of rogue objects he expects over any sequence of a predetermined number of objects (e.g., any sequence of 200 objects). A setting of "one" may be most practical for a wrong product getting onto the processing line. However, a higher setting may be more appropriate for the case of "silver bullets" (i.e., objects that get through the printing process without getting printed). Silver bullets can come down the line several at a time. As a result, an operator may want to set the maximum number of rogue objects to be higher than "one" (e.g., maybe "three").

Figure 7:
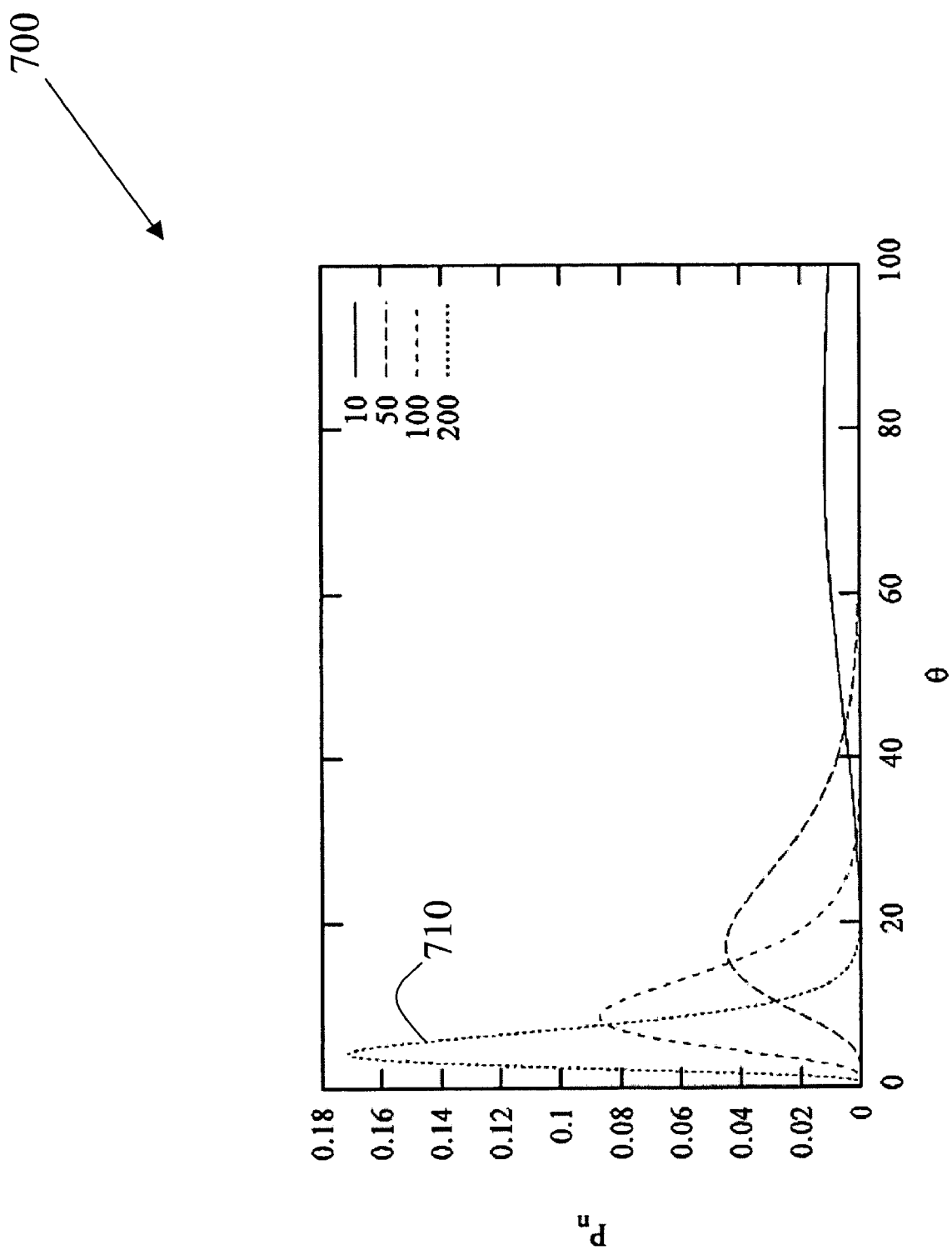
FIG. 7 illustrates a graph of probability density functions showing the probability density (per degree), $P_n$, versus maximum angle (in degrees), $\theta$, between nearest neighbor samples for several total numbers of samples of objects from a processing line.

FIG. 7 illustrates a graph 700 of probability density functions showing the probability density (per degree), $P_n$, versus maximum angle (in degrees), $\theta$, between nearest neighbor samples for several total numbers of samples of objects from a processing line. For example, the probability density curve 710 shows that, after sampling images of 200 randomly rotated substantially cylindrical soda cans, the most likely maximum angular difference between nearest neighbor soda cans is approximately 5 degrees. In other words, after imaging 200 randomly rotated soda cans from the same side of a processing line, the maximum expected angular difference between two neighboring orientations (i.e., adjacent views as you go around the soda can) of the 200 soda cans is about 5 degrees. Therefore, if a vector training set is formed from 200 samples (i.e., 200 randomly oriented soda cans on a processing line), the vector training set is likely to represent the printed outer surface of the current soda can product to within about 5 degrees. As the number of samples decreases, the most likely maximum angular difference increases, as seen in FIG. 7. Similarly, as the number of samples increases, the most likely maximum angular difference decreases.

Figure 8:
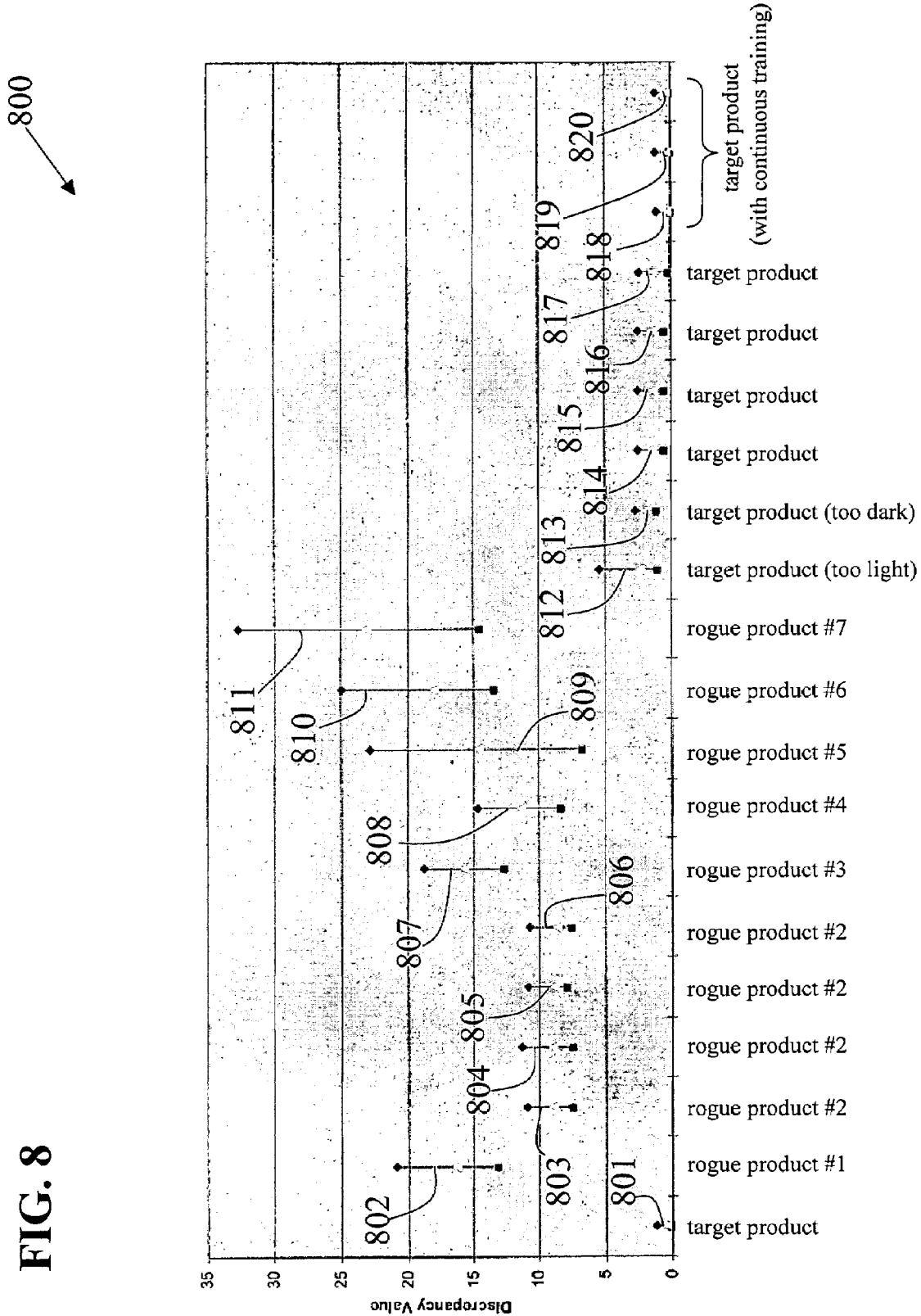
FIG. 8 illustrates an exemplary graph showing the deviation in discrepancy values for a number of different printed product types (object-types) using the vision system of FIG. 1, in accordance with an embodiment of the present invention.

FIG. 8 illustrates an exemplary graph 800 showing the deviation in discrepancy values for a number of different printed product types (object-types) using the vision system 100 of FIG. 1, in accordance with an embodiment of the present invention. A target product was run on a processing line using the vision system 100. The vision system 100 trained on the target product and then processed images captured from the target product to detect any rogue product. The deviation of resultant discrepancy values 801 for the target product are shown in the graph 800. The discrepancy values 801 are all approximately between values of 0 and 2. An operator may want to set the threshold value at about 3 or 4 such that any product having discrepancy values above the threshold value would be rejected as rogue product.

For example, several rogue products were next run on the processing line after the target product and the vision system 100 was commanded to not re-train at all (i.e., to not update the vector training set) as the rogue products passed by the vision system 100. That is, the vector training set still represented the original target product. The resultant discrepancy values 802 for the rogue product #1 are all above values of about 13. The resultant discrepancy values 803-806 for several sets of rogue product #2 are all between about 7 and 12. Clearly, if the threshold value were to be set at, for example, a value of 5, all of the rogue product #1 and #2 would be rejected as rogue product. Similarly, rogue products #3-#7 were subsequently run on the processing line and the resultant ranges of discrepancy values 807-811 are all well above the discrepancy values 801 of the original target product for which the vision system 100 was trained.

Next, some second target product was run on the processing line where the printed coloring of the second target product was too light. Again, the vector training set of the vision system 100 was not allowed to be updated. The resultant range of discrepancy values 812 are between about 2 and 6, showing more deviation than the discrepancy values 801 of the original target product for which the vision system 100 was trained. Similarly, some third target product was run on the processing line where the printed coloring of the third target product was too dark. Again, the vector training set of the vision system 100 was not allowed to be updated. The resultant range of discrepancy values 813 are between about 2 and 3, which is shifted slightly upward from the discrepancy values 801.

Next, several sets of original target product were again run on the processing line yielding the resultant ranges of discrepancy values 814-817. Again, the vector training set of the vision system was not allowed to be updated. The discrepancy values 814-817 all appear to be within a range of about 0 to 3. Finally, several sets of target product were again run on the processing line yielding the resultant ranges of discrepancy values 818-820. However, this time, the vision system 100 was allowed to continuously train (i.e., update the vector training set), using a threshold value of 4, as the target product came down the processing line. As a result, the ranges of discrepancy values tightened up to again be between values of about 0 and 2. The continuous training allows the vision system 100 to adapt to subtle changes in the target product and/or in the vision system itself, making the resultant discrepancy values more stable.

In summary, a system and methods to detect rogue objects on a product processing line are disclosed. A camera is used to collect an image of a predetermined number of objects passing by the camera of a vision system on the processing line. The images represent various random spatial orientations of the objects with respect to the camera. The image data from each image is converted to a vector of mean pixel values to form a vector training set. The vector training set is a good representation of the various possible spatial orientations of the objects as they pass by the camera. As each subsequent object, after the predetermined number of objects, pass by the camera, an image is acquired for each subsequent object and a vector of mean pixel values is generated for each subsequent object from the image data.

For a given subsequent object, its vector is compared to each vector in the vector training set and a determination is made as to whether or not the subsequent object is a "rogue" object. If the subsequent object is not a rogue object, then the vector corresponding to the subsequent object may replace a vector in the vector training set, providing continuous training of the vision system. The continuous training adapts to process drift and guarantees stable performance. Intelligent handling of grouped rejects automatically adapts to label changeovers. The imaging hardware of the vision system is standard and robust.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of training a vision system on a process monitoring line, said method comprising:
   acquiring one image from each object of a predetermined number of objects passing by a vision system on a process monitoring line using said vision system, wherein each said image corresponds to a random spatial orientation of each said corresponding object with respect to said vision system, and wherein each said image comprises at least one array of pixel values stored within said vision system;
   generating a plurality of mean pixel values, along one dimension of said at least one array of pixel values, for each said acquired image to form a vector of mean pixel values for each said acquired image, using said vision system; and
   storing each said vector of mean pixel values for each said acquired image within a memory of said vision system to form a vector training set of said vision system.

2. The method of claim 1 wherein said one dimension of said at least one array of pixel values comprises a horizontal row dimension.

3. The method of claim 1 wherein said one dimension of said at least one array of pixel values comprises a vertical column dimension.

4. The method of claim 1 wherein said at least one array of pixel values comprises an array of red (R) color pixel values, an array of green (G) color pixel values, and an array of blue (B) color pixel values for each said acquired image.

5. The method of claim 4 wherein each said vector of mean pixel values comprises a sub-vector of mean red pixel values, a sub-vector of mean green pixel values, and a sub-vector of mean blue pixel values.

6. The method of claim 1 further comprising:
   acquiring a first next image from a first next object passing by said vision system on said process monitoring line immediately after said predetermined number of objects, using said vision system, wherein said first next image corresponds to a random spatial orientation of said first next object with respect to said vision system, and wherein said first next image comprises at least one array of pixel values stored within said vision system;
   generating a first next plurality of mean pixel values, along said one dimension of said at least one array of pixel values of said first next image, to form a first next vector of mean pixel values using said vision system; and
   replacing a first stored vector of mean pixel values of said vector training set within said memory of said vision system with said first next vector of mean pixel values.

7. The method of claim 6 further comprising:
   acquiring a second next image from a second next object passing by said vision system on said process monitoring line immediately after said first next object, using said vision system, wherein said second next image corresponds to a random spatial orientation of said second next object with respect to said vision system, and wherein said second next image comprises at least one array of pixel values stored within said vision system;
   generating a second next plurality of mean pixel values, along said one dimension of said at least one array of pixel values of said second next image, to form a second next vector of mean pixel values, using said vision system; and
   replacing a second stored vector of mean pixel values of said vector training set within said memory of said vision system with said second next vector of mean pixel values.

8. The method of claim 7 wherein said one dimension comprises a horizontal row dimension.

9. The method of claim 7 wherein said one dimension comprises a vertical column dimension.

10. The method of claim 7 wherein said at least one array of pixel values for each said acquired image comprises at least one array of red, green, and blue (RGB) color pixel values.

11. The method of claim 10 wherein each said vector of mean pixel values comprises a sub-vector of mean red pixel values, a sub-vector of mean green pixel values, and a sub-vector of mean blue pixel values.

12. A method of monitoring objects on a process monitoring line, said method comprising:
   acquiring an image from a next object passing by a vision system on a process monitoring line, using said vision system, wherein said image corresponds to a random spatial orientation of said next object with respect to said vision system, and wherein said image comprises at least one array of pixel values stored within said vision system;
   generating a plurality of mean pixel values, along one dimension of said at least one array of pixel values for said acquired image, to form a next vector of mean pixel values for said acquired image, using said vision system;
   comparing said next vector of mean pixel values to each training vector of mean pixel values in a stored vector training set in said vision system to generate one discrepancy value for each training vector in said vector training set, forming a set of discrepancy values within said vision system; and
   selecting one discrepancy value from said set of discrepancy values and comparing said selected discrepancy value to a predetermined threshold value to determine if said next object is a rogue object, using said vision system.

13. The method of claim 12 further comprising declaring said next object to be a rogue object if said selected discrepancy value is greater than said predetermined threshold value, using said vision system.

14. The method of claim 12 wherein said selected discrepancy value corresponds to a smallest discrepancy value of said set of discrepancy values.

15. The method of claim 12 further comprising replacing a next vector of said vector training set with said next vector of mean pixel values for said acquired image if said next object is not a rogue object, using said vision system.

16. The method of claim 12 wherein said one dimension of said at least one array of pixel values comprises a horizontal row dimension.

17. The method of claim 12 wherein said one dimension of said at least one array of pixel values comprises a vertical column dimension.

18. The method of claim 12 wherein said at least one array of pixel values comprises at least one array of red, green, and blue (RGB) color pixel values for said acquired image.

19. The method of claim 18 wherein said next vector of mean pixel values comprises a sub-vector of mean red pixel values, a sub-vector of mean green pixel values, and a sub-vector of mean blue pixel values.

20. A vision system for training and monitoring a process, said vision system comprising:
  a source of illumination positioned to illuminate objects as said objects move along a process monitoring line in spatially random orientations;
  a camera positioned on said process monitoring line to capture at least one image from each of said illuminated objects, forming a plurality of images, as each object passes through a field-of-view of said camera; and
  a computer-based platform being connected to said camera to generate a vector of mean pixel values from each of said plurality of images, forming a plurality of vectors of mean pixel values, and to store at least some of said vectors of mean pixel values as a vector training set.

21. The vision system of claim 20 wherein said computer-based platform includes a frame grabber to convert analog signals, output from said camera, to digital signals representing single frames of digital pixel values.

22. The vision system of claim 20 wherein said plurality of images correspond to random rotational positions of said plurality of objects with respect to said camera as said objects move along said process monitoring line past said camera.

23. The vision system of claim 20 wherein said source of illumination comprises an array of light emitting diodes which emits a spectrum of white light.

24. The vision system of claim 20 wherein said camera outputs analog imaging signals.

25. The vision system of claim 20 wherein said camera outputs digital imaging signals.

26. The vision system of claim 20 further comprising a user interface for at least controlling said vision system.

27. A method for training and monitoring a process, said method comprising:
  generating a vector training set, comprising training vectors of mean pixel values, from images acquired from a predetermined number of objects passing by a vision system on a process monitoring line, using said vision system;
  generating a first next vector of mean pixel values from a first next image acquired from a first next object passing by said vision system on said process monitoring line immediately after said predetermined number of objects, using said vision system;
  comparing said first next vector to each training vector of said vector training set to generate one discrepancy value for each training vector, forming a set of discrepancy values, using said vision system; and
  selecting one discrepancy value from said set of discrepancy values and comparing said selected discrepancy value to a predetermined threshold value to determine if said next object is a rogue object, using said vision system.

28. The method of claim 27 further comprising replacing a first training vector of said vector training set with said first next vector if said first next object is not a rogue object, using said vision system.

29. The method of claim 28 further comprising:
  generating a second next vector of mean pixel values from a second next image acquired from a second next object passing by said vision system on said process monitoring line immediately after said first next object, using said vision system;
  comparing said second next vector to each training vector of said vector training set to generate one discrepancy value for each training vector, forming a next set of discrepancy values, using said vision system; and
  selecting one next discrepancy value from said next set of discrepancy values and comparing said selected next discrepancy value to said predetermined threshold value, using said vision system.

30. The method of claim 29 further comprising replacing a second training vector of said vector training set with said second next vector if said second next object is not a rogue object, using said vision system.

31. The method of claim 29 further comprising declaring said second next object to be a rogue object if said selected next discrepancy value is greater than said predetermined threshold value, using said vision system.

32. The method of claim 27 further comprising declaring said first next object to be a rogue object if said selected discrepancy value is greater than said predetermined threshold value, using said vision system.

* * * * *

UNITED STATES PATENT AND TRADEMARK OFFICE
CERTIFICATE OF CORRECTION

PATENT NO.        : 7,308,142 B2  
APPLICATION NO.   : 11/077288  
DATED             : December 11, 2007  
INVENTOR(S)       : Sones et al.

Page 1 of 1

It is certified that error appears in the above-identified patent and that said Letters Patent is hereby corrected as shown below:

On the title page, item (75) Inventors:

Replace "Brain M. Baird Mantua, OH (US)"

with --Brian M. Baird, Mantua, OH (US)--

Signed and Sealed this

Fifteenth Day of April, 2008

JON W. DUDAS  
*Director of the United States Patent and Trademark Office*